(No Model.)
J. JETT.
PRUNING SHEARS.
No. 362,383. Patented May 3, 1887.
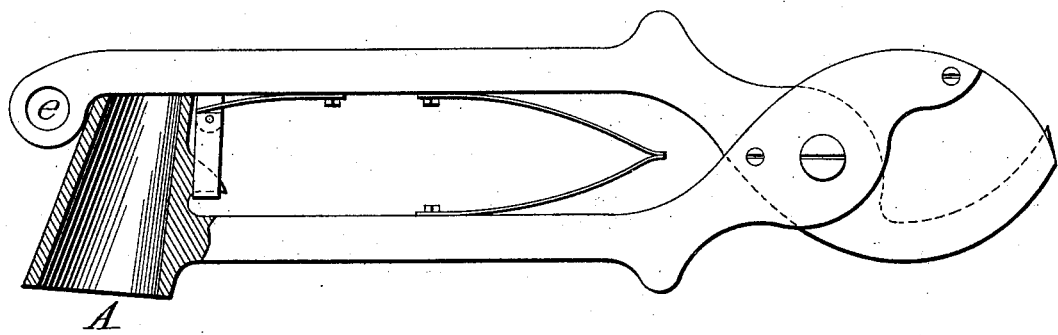
Witnesses:
Chas. E. Kelly
John R. Yontz
John Jett
Inventor.

UNITED STATES PATENT OFFICE.

JOHN JETT, OF SAN FRANCISCO, CALIFORNIA.

PRUNING-SHEARS.

SPECIFICATION forming part of Letters Patent No. 362,383, dated May 3, 1887.

Application filed September 22, 1884. Serial No. 143,727. (No model.)

*To all whom it may concern:*

Be it known that I, JOHN JETT, a citizen of the United States, residing at San Francisco, in the county of San Francisco and State of California, have invented a new and useful Improvement in Pruning-Shears, of which the following is a specification.

My invention relates to pruning-shears such as are used by hand; and the object of my improvement is a device by which the shears can be used by hand, and can also conveniently be placed on a staff or pole to be used in the tops of trees. I attain this object by the arrangement illustrated in the accompanying drawing, which represents a side view of a pair of shears, in which a portion of the lower handle is cut away, so as to show a vertical longitudinal section of the eye or socket A, which is at the end of the lower handle. This socket may be inclined or vertical, and extends up to the upper handle, so as to form a rest when the shears are closed. This socket may have a greater diameter on a line with the handle, so that the shears will not turn on the staff.

The upper handle projects over the upper end of the socket, and has an eye, e, by which a strap or line can be attached, so as to work the shears when using the staff. By this plan the shears will be nearly at a right angle to the staff, and the line, in working the shears, will pull almost directly against the end of the staff, and will thus avoid any side strain on the staff or socket.

The other parts of the shears may be in any of the usual forms, as my invention only applies to the handle, as herein shown and described, and in which my invention consists, thus forming a convenient handle for working by hand, and is also convenient to be placed on a staff to be used in the tops of trees.

I am aware of the patent issued to Surerus January 30, 1866, No. 52,337, which has a socket on a line with the handle of the shears and requires a small pulley to be attached to said socket in order to work the shears with a cord, and I claim no connection with the same.

What I do claim, and desire to secure by Letters Patent, is—

Pruning-shears having a socket, A, at right angles (or nearly so) to the lower handle, the upper handle extending beyond the same and resting upon it, and provided with an opening, e, for attaching a cord, substantially as and for the purpose set forth.

JOHN JETT.

Witnesses:
CHAS. E. KELLY,
WALTER MESSINGER.